Feb. 11, 1941.	E. WITZKE	2,231,742
TRANSMISSION CONTROLLING DEVICE
Filed April 12, 1940
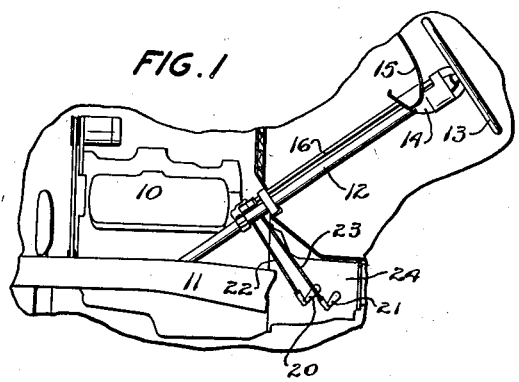
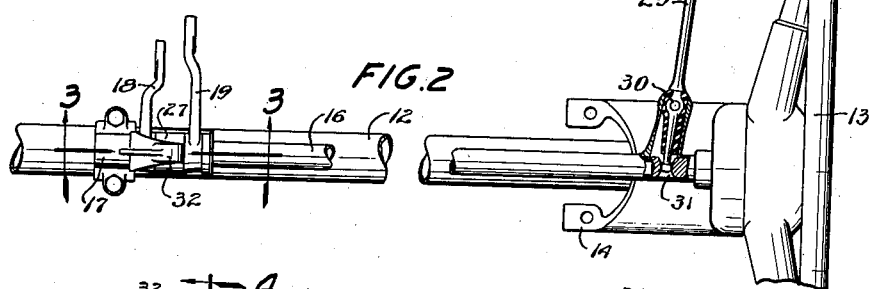
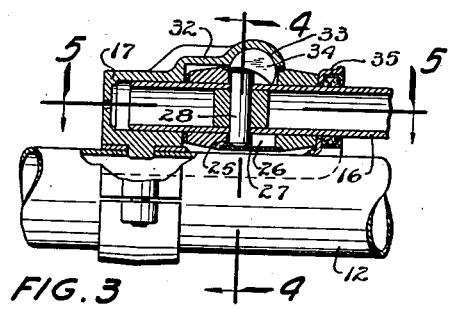
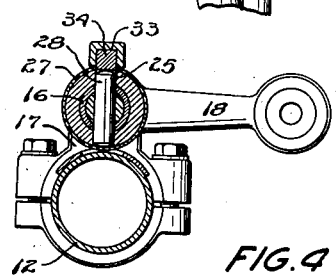
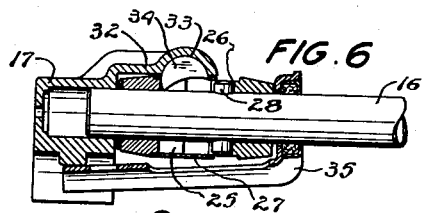
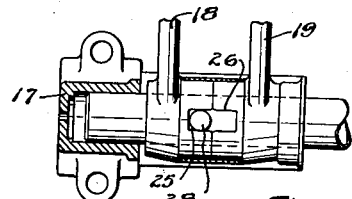
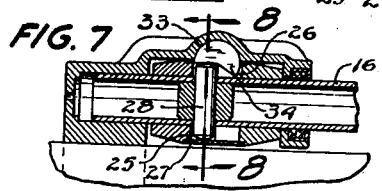
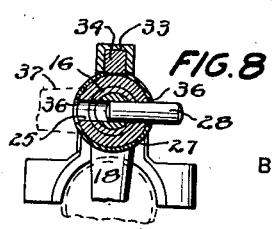
INVENTOR
Edmund Witzke
BY Edwin C. McRae
E. R. Davis
ATTORNEYS.

Patented Feb. 11, 1941

2,231,742

UNITED STATES PATENT OFFICE 2,231,742

TRANSMISSION CONTROLLING DEVICE

Edmund Witzke, Detroit, Mich., assignor to Ford Motor Company, Dearborn, Mich., a corporation of Delaware Application April 12, 1940, Serial No. 329,248

8 Claims. (Cl. 74—484)

The object of my invention is to provide a transmission controlling device for use in connection with motor vehicles.

More specifically my invention relates to a steering column type of gearshift for controlling an automobile sliding gear transmission. In this construction, a lever is mounted beneath the steering wheel of the vehicle which lever is connected through suitable linkage to the transmission so that movement of this lever to its various positions will shift the gears or clutches in the transmission to effect the various speed ratios obtainable therein. My specific improvements do not relate to the shifter lever or connecting linkage, per se, but rather to an interlocking means whereby certain inherent defects in this type of shifting mechanism are eliminated.

In the most commonly used type of steering column gearshifting device a shaft is reciprocally and rotatably mounted upon the steering column, the upper end of which is connected to a lever so that it may be reciprocated along the column and oscillated through a limited degree at either end of its stroke. The bottom of this shaft is usually provided with some sort of a clutch which selectively engages a pair of levers at the bottom end of the column so as to selectively oscillate either of these levers. The levers themselves are connected through suitable rods to shifter forks in the transmission to thereby shift the gears to their engaged positions. One disadvantage of such device is that when the gearshift lever is in a neutral position the control shaft is clutched to only one of the levers at the base of the steering column so that if someone is servicing the car from beneath they may accidentally move the other lever thereby shifting the transmission into one of its speed ratios without moving the operating shaft. If this occurs, the driver is unable to move the shift lever from its neutral position because the interlock device within such transmissions prevent the movement of one of the shifter forks when the other is in an engaged position. The improvement herein comprises means for preventing movement of either of the levers or their control linkage without a corresponding movement of the shifting lever. As this lever is under the control of the drivers such accident is not objectionable as the transmission may be readily shifted back to its neutral position.

With these and other objects in view, my invention consists in the arrangement, construction and combination of the various parts of my improved device, as described in this specification, claimed in my claims, and illustrated in the accompanying drawing, in which:

Figure 1 is a fragmentary view of a motor vehicle having my improvement installed thereon.

Figure 2 is a plan view of the steering column, shown in Figure 1.

Figure 3 is a sectional view, taken upon the lines 3—3 of Figure 2.

Figure 4 is a sectional view, taken upon the lines 4—4 of Figure 3.

Figure 5 is a sectional view, taken upon the line 5—5 of Figure 3.

Figure 6 is a sectional view, similar to that shown in Figure 3, illustrating the sequence of operations required to assemble the device.

Figure 7 is a view, similar to that shown in Figure 3, showing an alternate construction, and, Figure 8 is a sectional view, taken upon lines 8—8 of Figure 7 illustrating the position of the levers when the alternate construction is being assembled.

Referring to Figure 1 of the drawing, I have used the reference 10 to indicate the motor associated with a motor vehicle, said motor being mounted in a frame 11 in the conventional manner. A steering column 12 extends diagonally upwardly and rearwardly from the frame 11 and a steering wheel 13 is rotatably mounted upon the upper end of the column 12. A support 14 is adapted to be secured to the instrument board 15 of the vehicle to support the upper end of the steering column in the conventional manner.

A tubular shaft 16 has its upper end rotatably and reciprocally mounted in the support 14, which shaft extends downwardly through an opening in the floor boards of the car and has its lowermost end reciprocally and rotatably mounted in a bracket 17 which is clamped to the adjacent portion of the steering column 12. A pair of arms 18 and 19, respectively, are rotatably mounted upon the shaft 16 adjacent to the bracket 17, which arms are connected with transmission levers 20 and 21, respectively, by means of links 22 and 23, respectively. The levers 20 and 21 are rotatably mounted on the transmission 24 of the vehicle and function to slide the gears and clutches within the transmission to engage the several speed ratios obtainable therein. A suitable interlocking mechanism is provided within the transmission so that when either of the levers 20 and 21 is moved from their neutral positions it will be impossible to move the other lever from its neutral position.

From the foregoing it will be seen that oscillation of the arm 18 in either direction from the neutral position will oscillate the lever 20 accordingly to thereby engage two different speeds in the transmission and likewise, oscillation of the arm 19 will oscillate the lever 21 to thereby engage the other two speeds of the transmission.

Referring to Figure 5 it will be noted that the hub portions of the arms 18 and 19 are provided with diametrical slots 25 and 26, respectively, and that a sleeve 27 is loosely assembled over these hub portions to form an enclosure for the two slots. When the two arms 18 and 19 are in their neutral positions the slots 25 and 26 are aligned with each other. The lower end of the shaft 16 is provided with a transverse pin 28 extending therethrough which projects on each of the shafts sufficiently to enter either of the slots 25 or 26. When the shaft 16 is in the position shown in Figures 3 and 5, the pin 28 engages the slot 25 of arm 18 so that oscillation of shaft 16 will oscillate the arm 18. However, should the shaft 16 be moved upwardly from a neutral position then the pin 28 will enter the slot 26 so that oscillation of shaft 16 at this time will oscillate the arm 19. When the pin 28 is positioned in either of these slots and has been rotated by the shaft 16 the other slot will not be aligned with the pin. This insures that whichever arm is engaged by the pin 28 will have to be moved to its neutral position before the pin 28 can be withdrawn from the slot to engage the slot on the other arm.

An operating lever 29 is pivotally mounted upon a fulcrum 30 which projects outwardly from one side of the upper end of the shaft 16 and the inner end of the lever 29 is anchored in a stationary anchor 31 which is secured to the support 14. Thus, when the outer end of lever 29 is moved upwardly the shaft 16 will also be moved upwardly but at a reduced speed, according to the spacing of the fulcrum 30 from the anchor 31. A suitable spring, not shown in the drawing, is provided which resiliently urges the shaft 16 downwardly at all times.

In operating the device, as so far described, the operator draws the outer end of the lever 29 towards the wheel 13 to thereby raise the shaft 16 and engage the pin 28 with the slot 26 and then moves the lever 29 clockwise to cause the arm 19 to move likewise thereby engaging the first speed of the transmission. If reverse speed is desired the lever 29 is moved counterclockwise while adjacent to the wheel 13.

If after the first speed has been engaged the operator desires to engage the second speed, the lever 29 is moved to its neutral position at which time the aforementioned spring will pull the shaft 16 downwardly thereby engaging the pin 28 with the slot 25. The lever 29 is then moved counterclockwise to likewise move the arm 18 thereby engaging the second speed of the transmission. The third speed is engaged simply by moving the lever 29 clockwise through the neutral position. The aforementioned mechanism and sequence of operations are more or less conventional at the present time in the automotive industry and no claim is made herein to any part of this construction.

From the foregoing it will be seen that a possible difficulty arises with this arrangement because when the control lever 29 is in its neutral position it is possible to move the transmission lever 21 from its neutral position by an accidental push from beneath the car. It frequently happens while the car is being serviced that the attendant will strike a grease gun nozzle or wrench against one of these levers to thereby engage one of the transmission speeds. If the lever 20 is so accidentally moved it will also move the lever 29 as the pin 26 is normally in engagement with the slot 25 when the transmission is in neutral. However, should the lever 21 be moved at this time than the arm 19 will be moved to engage either the low or reverse speed of the transmission. When this happens the operator cannot move the pin 28 so as to be aligned with the slot 25 because the interlocking mechanism within the transmission prevents the movement of the lever 20 from its neutral position while the lever 21 is in either of its engaged positions. This is quite an annoying situation in the servicing of automobiles because the attendant who greases the car is not ordinarily capable of knowing the functions of the various operating parts of the car and can not be expected to know the operation of this device and consequently much inconvenience is sometimes caused by this simple dearrangement of the parts.

In order to prevent the aforementioned trouble, I have provided a projection 32 which extends upwardly from the bracket 17 to position above the pin 28. This projecting member is provided with a semi-spherical slot 33 therein which is machined by means of a standard Woodruff keyway cutter. A semi-spherical or cresent-shaped key member 34 is loosely mounted within the slot 33 so that it may oscillate back and forth in this slot. The key 34 is of crescent shape with the center of oscillation of the key substantially aligned with the intermediate point between the two slots 25 and 26. This key is so shaped that when the pin 28 is in the position shown in Figure 3 the key will have been removed from the slot 25 and oscillated clockwise to position where the other end of the key has been pushed downwardly into the slot 26.

If at this time it is desired to move the shaft 16 upwardly then the pin 28 simply moves the upper end of the key 34 out of the slot 26 while the lower end of this key oscillates down into the slot 25. When the parts are in the position shown in the Figure 3, which is the normal neutral position of the transmission, it will be impossible to oscillate the lever 21 because the arm 19 will be held in its neutral position by means of the key 34. This, however, will not in any way interfere with oscillation of the arm 18 and likewise, when the pin 28 is moved up into the slot 26 the key 34 will hold the arm 18 against oscillation but will not in any way interfere with oscillation of the arm 19. In this construction a slot is provided in the sleeve 27 through which the key oscillates.

It will be noted that a sheet metal bracket 35 is clamped against the steering column by means of the bracket 17 and extends forwardly and upwardly around the shaft 16 to prevent the dislocation of the levers 18 and 19 by movement of the shaft 16. Figure 6 illustrates the sequence of operations required to assemble this device from which it will be seen that the bracket 35 is first assembled on the shaft 16, then the arm 19 is assembled over the lower end of the shaft, and then the pin 28 is inserted into position. The key 34 is then inserted into the slot 33 and the arm 18 pushed laterally upwardly so that the end of the key 34 enters the slot 25. When in this position the lower end of the shaft 16 is inserted through the hub portion of the arm 18 into its mounting in the bracket 17 and then the arm 19 and bracket 35 are moved axially toward each other to clamp the arms between the brackets 35 and 17. The bracket 17 is clamped on the steering column by means of the bracket 35.

In the alternate construction, shown in Figures 7 and 8, the bracket 35 is cast integrally with the bracket 17 and offers a somewhat less expensive construction to manufacture. This arrangement functions the same as the previously described device but it is not apparent how the device may be assembled. With this construction the sleeve 27 is fixedly secured to the arm 19 and is provided with a relatively wide slot in its upper portion so that the normal oscillating movement of the arm 19 will not cause interference between the sleeve and the key 34. The sleeve 27 is also provided with diametrically opposed openings 36 through which the pin 28 may be inserted but these openings are spaced 90° from the key-receiving opening in the sleeve. The opening 36 are out of alignment with the pin 28 in all of its normal operating positions.

To assemble this device it is necessary that the key 34 be inserted into the slot 33, then the arm 18 is pushed into the sleeve 27 which is fixedly secured to the arm 19. The two arms are then inserted into the bracket 17. The arm 18 is then rotated from its neutral position, shown by dotted line 37, in Figure 8, 90 degrees to the position shown in full lines. This location would normally be occupied by the steering column of the vehicle, but this assembly is made before the unit is mounted upon the column so that there is no interference. At this time the openings 36 in the sleeve 27 becomes aligned with the slot 25 in the arm 18. The pin 28 is then inserted through the opening 36 to a central position upon the shaft 16. The arm 18 is then moved clockwise to the position shown by dotted lines 37 which is the normal operating position for this arm.

The bracket 17 is then clamped to the steering column. In this position there is no danger of the pin 28 sliding out from its central position on the shaft 16.

The principal advantage arising from the use of my improved construction is that accidental movement of the arm 19, link 23, or lever 21 is prevented to thereby make it impossible to move any of these members except with a corresponding movement of the lever 29 within the driver's compartment.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a vehicle transmission having several selectively engageable speed ratios therein, a pair of arms adapted to be selectively oscillated to cause selective engagement of said speed ratios, a shaft reciprocally and rotatably mounted adjacent to said arms, means for rotating and reciprocating said shaft, a clutch member associated with said shaft which in one position of reciprocation of said shaft clutches said shaft to one of said arms and in the other position of reciprocation of said shaft clutches said shaft to the other of said arms, a stationary bracket disposed adjacent to said arms, and an oscillating key member mounted in said bracket which upon movement of said shaft to clutching engagement with either of said arms is oscillated thereby to position where it locks the other of said arms against oscillation.

2. In a transmission having several selectively engageable speed ratios therein, a pair of axially aligned arms adapted to be selectively oscillated to cause selective engagement of said speed ratios, a shaft axially aligned with said arms, which shaft is reciprocally and rotatably mounted for movement relative thereto, means for rotating and reciprocating said shaft, a clutch member associated with said shaft which in one position of reciprocation clutches said shaft to one of said arms and in its other position of reciprocation clutches said shaft to the other of said arms, a stationary bracket disposed adjacent to said arms, and an oscillating key member mounted in said bracket which upon movement of said shaft to clutching engagement with either of said arms is oscillated thereby to a position where it locks the other of said arms against oscillation.

3. In a motor vehicle, a transmission having several selectively engageable speed ratios therein, a steering column, a pair of arms rotatably mounted upon said steering column, link members connecting said arms with said transmission so that said arms may be selectively oscillated to cause selective engagement of said speed ratios, a shaft reciprocally and rotatably mounted upon said steering column, the lower end of said shaft being disposed adjacent to said arms, means at the upper end of said shaft for rotating and reciprocating same, a clutch member disposed at the lower end of said shaft which in one position of reciprocation clutches said shaft to one of said arms and in its other position of reciprocation clutches said shaft to the other of said arms, a stationary bracket disposed adjacent to said arms, and an oscillating key member mounted in said bracket which upon movement of said shaft to clutching engagement with either of said arms is oscillated thereby to position where it locks the other of said arms against oscillation.

4. In a motor vehicle, a transmission having several selectively engageable speed ratios therein, a steering column, a pair of axially aligned arms rotatably mounted upon the lower end of said steering column, link members connecting said arms with said transmission so that selective oscillation of said arm causes selective engagement of said speed ratios, a shaft reciprocally and rotatably mounted upon said steering column, means for rotating and reciprocating said shaft, a pin extending transversely through said shaft which in one position of reciprocation of said shaft coacts with a notch in one of said arms to rotatably clutch said arm to said shaft and in its other position of reciprocation coacts with a notch in the other of said arms to rotatably clutch said other arm to said shaft, a stationary bracket disposed adjacent to said arms, and an oscillating key member mounted in said bracket which upon movement of said pin to clutching engagement with either of said arms is oscillated thereby to position where it enters the notch in the other of said arms to thereby hold said other arm against oscillation.

5. In a motor vehicle, a transmission having several selectively engageable speed ratios therein, a steering column, a pair of axially aligned arms rotatably mounted upon said steering column, link members connecting said arms with said transmission so that selective oscillation of said arms causes selective engagement of said speed ratios, a shaft reciprocally and rotatably mounted upon said column in axial alignment with said arms, means for rotating and reciprocating said shaft, a pin extending transversely through said shaft in alignment with said arms which in one position of reciprocation of said shaft enters a notch in one of said arms to clutch said arm to said shaft and in the other position of reciprocation of said shaft enters a notch in the other of said arms to thereby clutch said other arm to said shaft, a stationary bracket disposed adjacent to said arms, and an oscillating key member mounted in said bracket which, upon reciprocation of said shaft to cause engagement of said pin with one of said arms, is oscillated by said pin to a position where it engages the notch in the other of said arms and thus prevents oscillation of said other arm.

6. In a transmission shifting device, a steering column, a member supporting the upper end of said column, a bracket fixed upon the lower end of said column, a shaft rotatably and reciprocally mounted in said bracket and supporting member, a lever extending radially from the upper end of said shaft to both oscillate and reciprocate same, a pair of arms rotatably mounted upon the lower end of said shaft, means for restraining said arms against axial movement, links connecting said arms to said transmission so that selective oscillation of said arms selectively engages the speed ratios in said transmission, a clutch member associated with said shaft which in one position of reciprocation clutches said shaft to one of said arms and in its other position of reciprocation clutches said shaft to the other of said arms, and an oscillating crescent-shaped key member mounted in said bracket which upon movement of said shaft to clutching engagement with either of said arms is oscillated thereby to a position where it locks the other of said arms against oscillation.

7. In a vehicle transmission shifting device, a steering column, a member supporting the upper end of said column, a bracket fixed upon the lower end of said column, a shaft rotatably and reciprocally mounted in said bracket and supporting member, a lever extending radially from the upper end of said shaft for oscillating and reciprocating same, a pair of arms rotatably mounted side by side in axial alignment with the said shaft upon said bracket, a pair of link members connecting said arms respectively to said transmission so that oscillation of said arms causes selective engagement of the speed ratios in said transmission, the adjacent faces of said arms each having a diametrical slot therein, a pin member extending through said shaft which in one position of reciprocation of the shaft engages one of said notches to clutch said shaft to said arm and in its other position of reciprocation engages the other of said notches to clutch said shaft to the other of said arms, an oscillating crescent-shaped key member mounted in said bracket which upon movement of said shaft to clutching engagement with one of said arms is oscillated thereby to a position where it enters the notch in the other arm to thereby prevent oscillation of said other arm.

8. In a vehicle transmission shifting device, a steering column, a member supporting the upper end of said column, a bracket fixed upon the lower end of said column, a shaft rotatably and reciprocally mounted in said bracket and supporting member, a lever extending radially from the upper end of said shaft for oscillating and reciprocating same, a pair of arms rotatably mounted upon said bracket in axial alignment with said shaft, said shaft extending through the hub portions of said arms, link members connecting the outer ends of said arms with said transmission so that oscillation of said arms causes selective engagement of the speed ratios in said transmission, a pin member extending through said shaft in substantial alignment with said arms, the hub portions of said arms each having a diametrically extending slot therein, which slots are aligned with each other when said arms are in their neutral positions, said pin member in one position of reciprocation of said shaft engaging one of said notches to rotatably clutch said arm and shaft and in its other position of reciprocation engaging the other of said notches to rotatably clutch the other of said arms with said shaft, and an oscillating key member mounted in a spherical pocket in said bracket in such a position that upon movement of said pin to clutching engagement with the notch in one of said arms said key is oscillated to a position where it enters the notch associated with the other of said arms and thereby prevents oscillation of said other arm.

EDMUND WITZKE.